United States Patent
Schwarze et al.

(10) Patent No.: US 8,386,085 B2
(45) Date of Patent: Feb. 26, 2013

(54) METHOD FOR THE OPERATION OF A WIND TURBINE, AND WIND TURBINE FOR CARRYING OUT THIS METHOD

(75) Inventors: Holger Schwarze, Hamburg (DE); Nils Nommensen, Sittensen (DE); Wolfgang Kabatzke, Geesthacht (DE); Soeren Bilges, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 516 days.

(21) Appl. No.: 12/545,492

(22) Filed: Aug. 21, 2009

(65) Prior Publication Data
US 2010/0320761 A1    Dec. 23, 2010

(30) Foreign Application Priority Data
Jun. 18, 2009 (DE) .......................... 10 2009 025 445

(51) Int. Cl.
*G06F 19/00* (2011.01)
(52) U.S. Cl. .......................................... 700/287; 322/35

(58) Field of Classification Search ................... 700/287; 240/44; 322/35
See application file for complete search history.

(56) References Cited

U.S. PATENT DOCUMENTS

| | | | | |
|---|---|---|---|---|
| 4,333,018 A * | 6/1982 | Bottrell | ........................... | 290/55 |
| 4,355,955 A * | 10/1982 | Kisovec | ........................ | 416/23 |
| 7,317,260 B2 * | 1/2008 | Wilson | ............................ | 290/44 |
| 7,999,406 B2 * | 8/2011 | Cardinal et al. | ................ | 290/44 |
| 2008/0061559 A1 * | 3/2008 | Hirshberg | ...................... | 290/55 |
| 2009/0108582 A1 * | 4/2009 | Seibers et al. | ................ | 290/44 |
| 2009/0218818 A1 * | 9/2009 | Cardinal et al. | ................ | 290/44 |

FOREIGN PATENT DOCUMENTS
DE    198 44 258 A1    3/2000

* cited by examiner

*Primary Examiner* — Michael D Masinick
(74) *Attorney, Agent, or Firm* — Vidas, Arrett & Steinkraus, P.A.

(57) ABSTRACT

A method of operating a wind turbine, comprising the steps of measuring a meteorological value and using the measured meteorological value to preset a desired value for the turbine operation, to select an operation condition and/or to determine a boundary condition for the turbine operation, wherein the measured meteorological value is an air mass flow caused by the wind.

18 Claims, 2 Drawing Sheets

METHOD FOR THE OPERATION OF A WIND TURBINE, AND WIND TURBINE FOR CARRYING OUT THIS METHOD

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method of operating a wind turbine, in which a meteorological value is measured and, taking into account this measured value, a desired value for the turbine operation is preset, an operation condition is selected and/or a boundary condition is determined for the turbine operation, as well as to a wind turbine for carrying out this method.

The meteorological variable of central importance for the operation of a wind turbine is the wind speed. In known methods for the operation of a wind turbine, the wind speed is measured by a cup anemometer, for instance. It is also known to select an operation condition depending on the wind speed, by way of example, to shut down the wind turbine above a cut-out wind speed, for instance by adjusting the blade pitch angle to the feathered position.

It is also known to take into account other meteorological variables in the operation of wind turbines, for example the air pressure and the air temperature. Concerning this, the document DE 198 44 258 A1, the contents of which is incorporated herein by reference, proposes to measure the air density and to set the cut-out wind speed depending on the measured wind density. In particular, at a lower air density, a higher cut-out wind speed shall be used than at a higher air density. The cut-out wind speed is a boundary condition for the operation of a wind turbine and is determined depending on the air density.

This procedure is based on the known relation that the forces exerted by the wind, in particular the drag and lift forces, depend on the air density. In a simplified manner, for the occurring forces F holds:

$$F = \frac{1}{2}\rho_{air}Av^2 c_w, \quad \text{(equation 1)}$$

wherein $\rho_{air}$ designates the air density, A the area that is applicable for the force that is to be calculated, v the wind speed and $c_W$ the so-called force coefficient.

Also known is the relation $$P = \frac{1}{2}\rho_{air}Av^3 c_p \quad \text{(equation 2)}$$

for the power P of a wind turbine, wherein $c_p$ designates the power coefficient. In a general manner, both equations show the importance of the air density, which participates in the occurring forces as well as in the power of the wind turbine as a linear factor.

Starting from this, it is the objective of the present invention to optimize the operation of a wind turbine.

BRIEF SUMMARY OF THE INVENTION

In the method of the present invention, a meteorological value is measured, and the measured meteorological value is used to preset a desired value for the turbine operation, to select an operation condition and/or to determine a boundary condition for the turbine operation, wherein the measured meteorological value is an air mass flow caused by the wind.

The present invention is based on the finding that taking into account an air mass flow caused by the wind can improve and simplify the control of the wind turbine in several aspects. In particular, by taking into account the air mass flow, the air density can be accounted for implicitly, without it being necessary to measure it as a separate value. The fundamental importance of the air mass flow for the operation of a wind turbine will also become recognizable from the following consideration.

The air mass flow is described by the equation $$\dot{m} = A_{flow} v \rho_{air} \quad \text{(equation 3)}$$

wherein $A_{flow}$ designates the area that is flown through by the contemplated air mass flow, and $\dot{m}$ designates the air mass flow itself. As indicated by the point, the air mass flow can be understood as the time derivative of the amount of air that passes through the area $A_{flow}$. The combination of the expression for the air mass flow with the two basic equations 1 and 2 mentioned above leads to the following expressions for the occurring forces and the power:

$$F = \frac{1}{2}\frac{A}{A_{flow}} c_w v \dot{m} \quad \text{(equation 4)}$$

$$P = \frac{1}{2}\frac{A}{A_{flow}} c_p v^2 \dot{m} \quad \text{(equation 5)}$$

The air density $\rho_{air}$ does not any longer occur in the two last equations. Thus, by capturing the air mass flow $\dot{m}$, it is possible to determine the variables that are important for the turbine operation and which can be ascribed to the occurring forces or to the power that is provided by the air flow or usable by the wind turbine, respectively.

Measuring an air mass flow is widely spread in the industry, in particular, it is used in controlling internal combustion engines, such as those in automobiles. Thus, the present method can possibly be performed with less expense than a separate measurement of the air density.

A further advantage is that the real air density can be acquired when the air mass flow is measured. On the contrary, measuring the air density is not possible without further ado, and it is frequently approximated by measuring the air pressure. If necessary, a measured air temperature can also be taken into account in determining the air density, thus allowing to determine the air density more accurately. However, even the air humidity exerts an influence on the air density, so it must be measured separately if necessary.

Using the air mass flow according to the present invention takes place in the control system of the wind turbine, which controls and regulates the components of the wind turbine. For instance, the control system may preset a generator torque; trigger a blade pitch controller and so on. Using the air mass flow can mean in particular that it participates in a mathematical calculation of an operation variable, or that an operation variable is adapted when the air mass flow reaches, falls below or exceeds predefined critical values.

The measured value representative for the air mass flow caused by the wind is provided to the control system. For instance, the primary measured variable may be the power intake of a heating element kept at constant temperature by a closed loop control, e.g. of a heat wire placed in the air flow. This measured variable is a direct measure for the air mass flow. This measurement principle is known from heat wire or hot film air mass sensors that are used in the industry.

Also comprised in the present invention is to determine the air mass flow within a suitable air mass sensor by combining several measured variables, in particular for an air volume flow or a flow speed, an air temperature, an air pressure and possibly an air humidity, for instance by way of characteristic curves stored in the air mass sensor, or by calculation within the air mass sensor. For instance, this may be done with a so-called Karman-Vortex air mass sensor, in which the flow speed is determined by means of ultrasonic Doppler anemometry.

In all these cases, one single measured value is eventually provided to the control system of the wind turbine, which represents the air mass flow. For instance, the measured value may be present in the unit kg/h, or be converted into the same by application of a constant numerical factor. Furthermore, the measured value always refers to a defined area. This may be the area through which the air flow caused by the wind flows during the measurement, or another predefined reference variable, for instance an area of 1 cm². For instance, the air flow and the cross sectional area used for the measurement can be limited by a pipe for measurement purposes.

Of course, other meteorological variables, such as the wind speed in particular, can be measured in addition to the air mass flow in the method of the present invention, and even plural desired values for the turbine operation can be preset at the same time, for instance a desired value for the pitch angle and a desired value for the rotor's rotational speed.

Selecting an operation condition may for example consist in shutting down the wind turbine or in setting it into the idle operation. This selection of the operation mode can be performed taking into account the air mass flow, for instance, a certain mode of operation can be selected if a certain air mass flow is exceeded.

In a preferred embodiment, the desired value is a generator torque. The generator torque counter-acts, if applicable via a gearbox, the torque taken up from the wind by a rotor. Thus, due to the relation indicated in equation 4, reasonably an optimum desired value for the generator torque can be preset taking into account the air mass flow $\dot{m}$. For instance, the desired value for the generator torque can be decreased starting from an air mass flow limit.

According to one embodiment, the desired value is an electric power. The electric power that can be provided by the wind turbine correlates with the air mass flow according to equation 5 shown above. Thus, an optimum desired value for the electric power can be preset taking into account the air mass flow in particular. For instance, the desired value for the electric power can be decreased starting from a certain air mass flow limit.

According to one embodiment, the boundary condition concerns a maximum admissible value of a load that is caused by the wind. Loads of components of the wind turbine that are caused by the wind, such as loads of the rotor blades for instance, are linked with the air mass flow due to equation 4. Reasonably, the boundary condition, for instance a maximum admissible rotor speed, is determined taking into account the air mass flow.

In one embodiment, the boundary condition is a cut-out wind speed. When the cut-out wind speed is reached, the wind turbine can be shut down or set into another operation condition. If a cut-out wind speed is determined taking into account the air mass flow this may reflect the actually occurring loads which necessitate the shut down of the wind turbine more accurately than a fixed cut-out wind speed. Using the air mass flow, it is possible to determine a cut-out wind speed that reflects the real loads even more accurately than when additionally taking into account the air density, as is known from DE 198 44 258 A1, the entire contents of which is incorporated herein by reference. The reason for this that the air density taken into account in the known method often only approximates the real air density, whereas, due to the measurement principle of the present invention, through the measurement of the air mass flow the really present air density can always be taken into account.

In one embodiment, the boundary condition is a cut-in wind speed. The cut-in wind speed is the wind speed at which the wind turbine is connected to the grid and set into the power output mode. When determining the cut-in wind speed, it is desirable to start the power output of the wind turbine as soon as this is possible under economic aspects. Taking into account the air mass flow, it can be more reliably judged whether a power output is possible under economic aspects. For instance, the power output can be started already at a lower wind speed when, due to a high air density, a relatively high air mass flow accompanies this small wind speed. Thus, a better overall usage of the existing wind is possible.

According to one embodiment, presetting the desired value or determining the boundary condition is performed by way of a characteristic curve, which associates a desired value or a value for the boundary condition, respectively, to each value of the product of the wind speed and the air mass flow. Basically, the air mass flow can be taken into account by the control system in any arbitrary manner, for instance by calculating the desired value on the basis of a mathematical formula. In practice, characteristic curves are often used instead, in order to avoid sumptuous calculations and to facilitate adjustments which cannot easily be integrated into mathematical formulas. The characteristic curve can be stored in a given memory area of a computer which is used by the control system. To preset a desired value or to determine a boundary condition by way of the characteristic curve the control system generates the product of a measured wind speed and the measured air mass flow using a computer program, and determines the desired value or the value for the boundary condition associated to this product, respectively, by evaluating the stored characteristic curve, and uses that for the further turbine operation. To store a characteristic curve which is based on the product of wind speed and air mass flow is particularly useful, because there is a linear relation between this product and the occurring forces, as can be seen from equation 4.

In one embodiment, presetting the desired value or determining the boundary condition is performed by way of a characteristic curve, which associates a desired value or a value for the boundary condition, respectively, to each value of the product of the rotor or generator rotational speed and the air mass flow. The characteristic curve defined this way is particularly practical for presetting a desired value for the generator torque in part load operation. It is known to preset the generator torque $M_{gen}$ using the following formula:

$$M_{gen} = \frac{c_p \rho_{air} \pi R^5}{2\lambda^3} \Omega^2, \quad \text{(equation 6)}$$

wherein R designates the rotor radius, $\Omega$ the rotor rotational speed and $\lambda$ the tip-speed ratio. The air density $\rho_{air}$ can in turn be eliminated by combining equation 6 with equation 3, which results in the following equation for the generator torque:

$$M_{gen} = \frac{c_p \pi R^4}{2\lambda^2 A_{flow}} \Omega \dot{m}. \quad \text{(equation 7)}$$

This equation shows the proportionality of the generator torque to be preset with the product of rotor rotational speed and air mass flow.

The wind turbine of the present invention has a rotor with at least one rotor blade, a generator, a device for measuring a meteorological value and a control system, which uses the measured meteorological value to preset a desired value for the turbine operation, to select an operation condition and/or to determine a boundary condition for the turbine operation, wherein the device for measuring the meteorological value is an air mass sensor adapted to measure an air mass flow caused by the wind.

For the explanation of the components and of the advantages of the wind turbine, it is made reference to the above explanations of the method of the present invention. The wind turbine is suited for carrying out the present invention.

BRIEF DESCRIPTION OF THE FIGURES OF THE DRAWINGS

The present invention is explained in more detail below, by way of three figures which refer to embodiments of the present invention. They show.

DETAILED DESCRIPTION OF THE INVENTION

Figure 1:
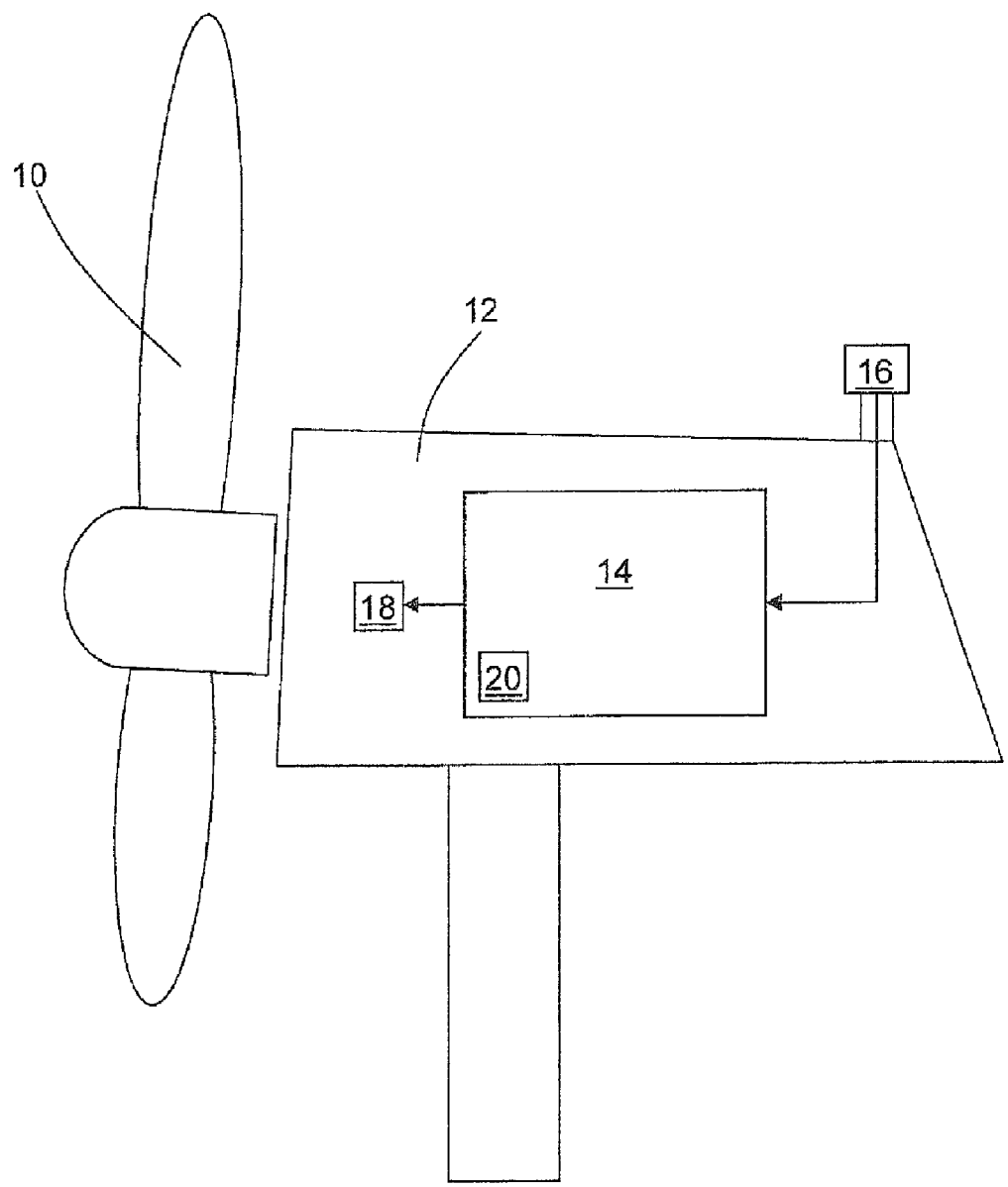
FIG. 1 a wind turbine of the present invention.

While this invention may be embodied in many different forms, there are described in detail herein a specific preferred embodiment of the invention. This description is an exemplification of the principles of the invention and is not intended to limit the invention to the particular embodiment illustrated FIG. 1 shows a wind turbine with a rotor 10, which has at least one rotor blade, and a nacelle 12, in which a generator (not shown) is arranged that is driven by the rotor 10. The wind turbine features a control system 14, which controls the wind turbine. The control system 14 is connected to an air mass sensor 16, which provides the control system 14 with a measured value for the air mass flow that passes through a defined area and is caused by the wind. Taking into account the measured value for the air mass flow, the control system 14 presets a desired value 18 for the operation of the turbine, a generator torque for instance. Furthermore, taking into account the measured value for the air mass flow, the control system 14 determines a boundary condition 20. By way of example, the latter may be a cut-out wind speed.

Figure 2:
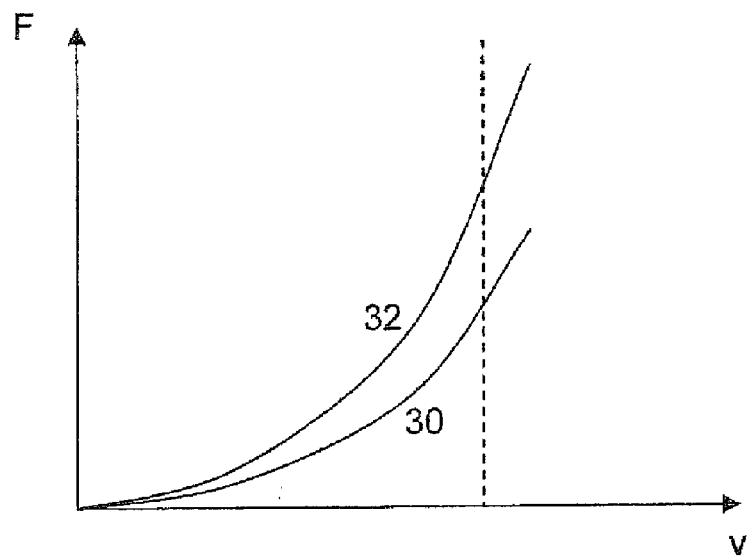
FIG. 2 a diagram for the load of a component of the wind turbine plotted against the wind speed at different air densities.

FIG. 2 shows a load of a component of the wind turbine, of a rotor blade for instance, plotted against the wind speed. The curve 30 shows the load at a first air density $\rho_1$ the curve 32 at a second air density $\rho_2$. The air density $\rho_2$ is greater than the air density $\rho_1$, so also the load associated by the curve 32 to a certain wind speed v is higher than that of the curve 30. As the load increases basically with the square of the wind speed, the curves 30 and 32 show the typical course of a square function.

Figure 3:
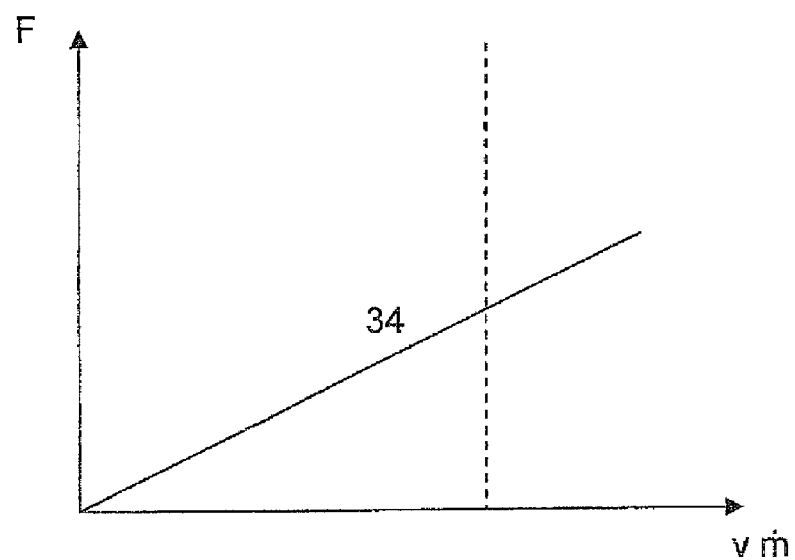
FIG. 3 a further diagram for the load of a component of the wind turbine plotted against the product of a wind speed and an air mass flow.

In FIG. 3, the load is not plotted against the wind velocity v, but against the product of the wind velocity v and the air mass flow $\dot{m}$. One single curve 34 results in this diagram, which equally holds for different air densities. Moreover, because there is a linear relation between the load and the product of the wind speed v and the air mass flow $\dot{m}$, the curve 34 is linear.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of operating a wind turbine, comprising the steps of measuring a meteorological value and using the measured meteorological value to preset a desired value (18) for the turbine operation, to select an operation condition and/or to determine a boundary condition (20) for the turbine operation, wherein the measured meteorological value is an air mass flow caused by the wind, and wherein the meteorological value is measured using an air mass sensor (16) adapted to measure the air mass flow caused by the wind.

2. A method according to claim 1, wherein the desired value (18) is a generator torque.

3. A method according to claim 1, wherein the desired value (18) is an electric power.

4. A method according to claim 1, wherein the boundary condition (20) concerns a maximum admissible value of a load that is caused by the wind.

5. A method according to claim 1, wherein the boundary condition (20) is a cut-out wind speed.

6. A method according to claim 1, wherein the boundary condition (20) is a cut-in wind speed.

7. A method according to claim 1, wherein the desired value (18) is preset, or the boundary condition (20) is determined, by way of a characteristic curve, which associates a desired value (18) or a value for the boundary condition (20), respectively, to each value of the product of the wind speed (v) and the air mass flow ($\dot{m}$).

8. A method according to claim 1, wherein the desired value (18) is preset, or the boundary condition (20) is determined, by way of a characteristic curve, which associates a desired value (18) or a value for the boundary condition (20), respectively, to each value of the product of the rotor or generator rotational speed and the air mass flow.

9. A method according to claim 1, wherein the desired value (18) is preset, or the boundary condition (20) is determined, by way of a characteristic curve, which associates a desired value (18) or a value for the boundary condition (20), respectively, to each value of the product of the square of the wind speed (v) and the air mass flow ($\dot{m}$).

10. A wind turbine comprising a rotor (10) having at least one rotor blade, a generator, a device for measuring a meteorological value and a control system (14), which uses the measured meteorological value to preset a desired value (18) for the turbine operation, to select an operation condition and/or to determine a boundary condition (20) for the turbine operation, wherein the device for measuring the meteorological value is an air mass sensor (16) adapted to measure an air mass flow caused by the wind.

11. A wind turbine according to claim 10, wherein the control system (14) uses the measured meteorological value to preset a desired value (18) for a generator torque.

12. A wind turbine according to claim 10, wherein the control system (14) uses the measured meteorological value to preset a desired value (18) for an electric power.

13. A wind turbine according to claim 10, wherein the control system (14) uses the measured meteorological value to determine a boundary condition (20) which concerns a maximum admissible value of a load that is caused by the wind.

14. A wind turbine according to claim 10, wherein the control system (14) uses the measured meteorological value to determine a cut-out wind speed.

15. A wind turbine according to claim 10, wherein the control system (14) uses the measured meteorological value to determine a cut-in wind speed.

16. A wind turbine according to claim 10, wherein the control system (14) features a device in which a characteristic curve is stored, which associates a desired value (18) or a value for the boundary condition (20), respectively, to each value of the product of the wind speed (v) and the air mass flow ($\dot{m}$).

17. A wind turbine according to claim 10, wherein the control system (14) features a device in which a characteristic curve is stored, which associates a desired value (18) or a value for the boundary condition (20), respectively, to each value of the product of the rotor or generator rotational speed and the air mass flow ($\dot{m}$).

18. A wind turbine according to claim 10, wherein the control system (14) features a device in which a characteristic curve is stored, which associates a desired value (18) or a value for the boundary condition (20), respectively, to each value of the product of the square of the wind speed (v) and the air mass flow ($\dot{m}$).

* * * * *